United States Patent
Leavitt et al.

(10) Patent No.: US 11,986,828 B2
(45) Date of Patent: May 21, 2024

(54) PATHOLOGICAL SLIDES AND RELATED SYSTEMS AND METHODS

(71) Applicant: Leavitt Medical, Inc., Lehi, UT (US)

(72) Inventors: Matthew O. Leavitt, Salt Lake City, UT (US); Mark S. Evans, Orem, UT (US); Michael Andrew Ivie, Orem, UT (US)

(73) Assignee: Leavitt Medical, Inc., Lehi, UT (US)

( * ) Notice: Subject to any disclaimer, the term of this patent is extended or adjusted under 35 U.S.C. 154(b) by 1018 days.

(21) Appl. No.: 16/668,169

(22) Filed: Oct. 30, 2019

(65) Prior Publication Data
US 2020/0139361 A1    May 7, 2020

Related U.S. Application Data

(60) Provisional application No. 62/753,917, filed on Nov. 1, 2018.

(51) Int. Cl.
*B01L 3/00* (2006.01)
*G01N 1/30* (2006.01)
*G01N 1/31* (2006.01)
*G01N 35/00* (2006.01)

(52) U.S. Cl.
CPC .............. *B01L 3/508* (2013.01); *G01N 1/30* (2013.01); *G01N 1/312* (2013.01); *G01N 35/00029* (2013.01); *B01L 2300/021* (2013.01); *B01L 2300/022* (2013.01); *B01L 2300/0822* (2013.01); *B01L 2300/168* (2013.01)

(58) Field of Classification Search
CPC .................. B01L 2300/0822; B01L 2300/022
See application file for complete search history.

(56) References Cited

U.S. PATENT DOCUMENTS

| | | | |
|---|---|---|---|
| 6,246,785 B1 | 6/2001 | Molnar et al. | |
| 9,851,349 B2 | 12/2017 | Musat | |
| D836,796 S | 12/2018 | Leavitt et al. | |
| 2006/0216744 A1* | 9/2006 | Chu | B01L 3/50853 427/2.11 |
| 2012/0218400 A1 | 8/2012 | Kurata et al. | |
| 2015/0211964 A1 | 7/2015 | Stocker et al. | |

(Continued)

FOREIGN PATENT DOCUMENTS

WO    2020/092550 A1    5/2020

OTHER PUBLICATIONS

International Search Report and Written Opinion dated Jan. 17, 2020, PCT/US2019/058849, international filing date Oct. 30, 2019.

(Continued)

*Primary Examiner* — Natalia Levkovich
(74) *Attorney, Agent, or Firm* — Greenberg Traurig, LLP

(57) ABSTRACT

The disclosed pathology slides may include a substantially transparent substrate that includes a top major surface, at least two regions on the top major surface of the substantially transparent substrate having a size sufficient for receiving at least two respective biopsy tissue sample sections on the substantially transparent substrate, and at least one visibly perceptible separation mark on or in the substantially transparent substrate separating the at least two regions from each other. Various other related methods and systems are also disclosed.

10 Claims, 6 Drawing Sheets

(56) References Cited

U.S. PATENT DOCUMENTS

2015/0370060 A1 12/2015 Williams et al.
2018/0226138 A1 8/2018 Leavitt et al.

OTHER PUBLICATIONS

First Examination Report received for Indian Patent Application Serial No. 202117018482 dated Feb. 22, 2022, 8 pages.
International Preliminary Report on Patentability received for PCT Application Serial No. PCT/US2019/058849 dated May 14, 2021, 9 pages.

* cited by examiner

PATHOLOGICAL SLIDES AND RELATED SYSTEMS AND METHODS

CROSS-REFERENCE TO RELATED APPLICATION

This application claims priority to U.S. Provisional Patent Application Ser. No. 62/753,917, titled "PATHOLOGICAL SLIDES AND RELATED SYSTEMS AND METHODS," filed 1 Nov. 2018, the entire disclosure of which is hereby incorporated by reference herein.

BACKGROUND

Pathology is a branch of medicine that involves the study and diagnosis of diseases, usually by examination of tissue samples or bodily fluids. Histopathology generally refers to the examination of tissue samples that are sectioned and placed onto glass slides. The process of histopathology involves obtaining a tissue sample from a patient and preparing the tissue sample for review by a pathologist. Chemical fixation is a common way of preparing tissue samples for histological review.

In chemical fixation, the tissue sample is initially preserved by exposure to a chemical fixative, such as formalin. Typically, the tissue sample is transported to a laboratory in a bottle of formalin, after which the tissue sample is removed by a laboratory technician for further processing. The tissue sample is often dehydrated, such as by positioning the tissue sample in baths of ethanol solution, with successively higher concentrations of ethanol in each bath. Eventually, the ethanol replaces water in the tissue sample, and the tissue sample is dehydrated. A hydrophobic clearing agent, such as xylene, is then used to remove the ethanol from the tissue sample. The tissue sample is then infiltrated with an infiltration agent, such as paraffin wax or an epoxy resin. At this stage, the water originally present in the tissue sample may be substantially fully replaced by the infiltration agent, and the remaining cellular material may be fixed in place.

In the case of a paraffin wax infiltration agent, the fixed tissue sample is conventionally positioned in a mold carrying molten paraffin wax, which is then hardened. The hardened block of paraffin wax includes an embedded tissue sample. Sections of the tissue block may then be obtained, such as by using a microtome. The sections of paraffin wax and tissue sample may then be floated in a water bath, and the laboratory technician may extract and place the section on a glass microscope slide by dipping the slide in the water bath under the section and lifting the section out of the water bath and onto the slide. If additional portions of the tissue sample remain in the tissue block after initial sections are obtained, the remainder of the tissue block may be stored for further sectioning as may be requested by a pathologist for further review of the tissue sample.

Next, the tissue sample on the glass slide may be stained with various pathology stains to highlight different cell structures, after which a protective coating may be applied to the glass slide. Finally, the stained tissue sample may be reviewed by a pathologist, such as under a microscope, in an attempt to identify and/or diagnose cell structures of concern (e.g., cancerous cells). For example, a stain commonly used for certain tissue samples is hematoxylin and eosin ("H&E"). Some procedures and diagnoses may benefit from the use of specialized stains. For example, a so-called "PIN4" stain includes three antibodies that may be useful in distinguishing prostatic adenocarcinoma from similar, but benign, cellular structures. However, such specialized stains are often significantly more expensive (e.g., hundreds or thousands of times more expensive) than other common stains. The expense of the specialized stains may make it impractical to initially process the tissue sample with the specialized stains without some specific indication that such specialized stains would be needed or helpful. For example, a pathologist may notice a cell structure of concern after reviewing a tissue sample that has been initially stained, such as with H&E. To confirm or eliminate a diagnosis or to obtain an improved view of the cell structure of concern, the pathologist may request that another, different (e.g., specialized, PIN4, etc.) stain be applied to the same tissue sample. In this case, the block may be obtained from storage, a new section may be obtained and placed on a glass slide, and the different stain may be applied to the new section.

The number of sections that can be taken from a tissue block is limited. Therefore, it is generally desirable to take and process only the number of sections that are required to obtain a usable sample. Thus, often only a single tissue sample section is stained with a specialized stain.

Through each step of conventional histopathology procedures, the tissue sample container(s) may be labeled and tracked to identify the tissue sample and the patient from which the tissue sample was taken. Mislabeling or otherwise mishandling the tissue samples may result in improper diagnoses, lost tissue samples, or other errors. Such errors may require the taking of additional tissue samples from the patient, additional expense, or improper corrective procedures. Thus, tissue samples of different types and/or from different patients are not conventionally mixed or processed together, especially through steps in which the labeling is not distinguished.

SUMMARY

In some embodiments, the present disclosure includes pathology slides. The pathology slides may include a substantially transparent substrate that includes a top major surface, at least two regions on the top major surface, and at least one visibly perceptible separation mark on or in the substantially transparent substrate. The at least two regions may have a size sufficient for receiving at least two respective biopsy tissue sample sections on the substantially transparent substrate. The at least one visibly perceptible separation mark may separate the at least two regions from each other.

In some examples, the at least two regions may include at least three regions for receiving at least three respective biopsy tissue sample sections. The at least one visibly perceptible separation mark may include at least two visibly perceptible separation marks separating the at least three regions from each other. The pathology slide may also include a tracking region adjacent to the at least two regions. The tracking region may have a size sufficient to receive at least one of a radio-frequency identification (RFID) chip, a slide label, or a printing medium. The pathology slide may include a slide label that is adhered to the tracking region. The slide label may be configured to include printed information identifying at least one of a biopsy tissue sample section identifier, a patient identifier, a date, a stain identifier, or a biopsy tissue sample section tracking code.

In some examples, the substantially transparent substrate may include a glass substrate. The substantially transparent substrate may include a bottom major surface opposite the top major surface. The at least one visibly perceptible separation mark may be located on the bottom major surface. The at least one visibly perceptible separation mark may include a void in the substantially transparent substrate. The at least one visibly perceptible separation mark may include at least one substantially straight line.

In some embodiments, the present disclosure includes methods for preparing and processing a pathology slide. In accordance with such methods, a first biopsy tissue sample section and a second biopsy tissue sample section may be obtained. The first biopsy tissue sample section may be positioned in a first region of a top major surface of a substantially transparent substrate of a pathology slide. The first region may be located on a first side of a visibly perceptible separation mark on or in the substantially transparent substrate. The second biopsy tissue sample section may be positioned in a second region of the top major surface of the substantially transparent substrate. The second region may be located on a second, opposite side of the visibly perceptible separation mark. The first biopsy tissue sample section and the section biopsy tissue sample section may together be stained with a pathology stain.

In some examples, the first biopsy tissue sample section may be obtained by sectioning a first tissue block containing tissue from a first patient. Obtaining the second biopsy tissue sample section may include sectioning a second tissue block containing tissue from a second, different patient. Identification information may be printed on a slide label adhered to the substantially transparent substrate. The identification information may identify the first patient and the second, different patient. A whole slide image of the pathology slide may be obtained. The whole slide image may include at least the visibly perceptible separation mark, the stained first biopsy tissue sample section, and the stained second biopsy tissue sample section. The whole slide image may be split into a first image including the stained first biopsy tissue sample and the visibly perceptible separation mark, and a second image including the stained second biopsy tissue sample and the visibly perceptible separation mark. The whole slide image or a portion thereof may be analyzed using artificial intelligence to identify one or more features of the pathology slide, the first biopsy tissue sample section, and/or the second biopsy tissue sample section.

In some embodiments, the present disclosure includes computer-implemented methods for biopsy tissue sample processing. In accordance with such methods, a first identification of a pathology stain and of a first tissue sample to be stained with the pathology stain may be received at a processor from a user. The first tissue sample may originate from a first patient. A second identification of the same pathology stain and of a second tissue sample to be stained with the same pathology stain may be received at the processor from the user. The processor may cause instructions to be provided to a laboratory computing system for a first section of the first tissue sample to be positioned on a pathology slide in a first region on a first side of a visibly perceptible separation mark on or in a substantially transparent substrate of the pathology slide. The processor may also cause instructions to be provided to the laboratory computing system for a second section of the second tissue sample to be positioned on the same pathology slide in a second region on a second, opposite side of the visibly perceptible separation mark.

In some examples, the computer-implemented methods may also include the processor causing an indication to be provided to the laboratory computing system of the pathology stain to be applied to the first section and to the second section. A label on the pathology slide may be caused, by the processor, to be printed with information identifying at least one of: tracking information for the first tissue sample and for the second tissue sample; the pathology stain to be applied to the first section and to the second section; a date; the first tissue sample and the second tissue sample; or the first patient and the second, different patient. The processor may cause a digital image to be taken of the pathology slide, the first section, and the second section. The digital image may be split, by the processor, into a first digital image including the first section and a second digital image including the second section. The processor may present at least a portion of the digital image to the user for review. The processor may digitally analyze at least a portion of the digital image to identify at least one feature in the digital image.

DETAILED DESCRIPTION

The present disclosure provides pathological slides, methods, and systems for histopathological processing of tissue samples. In some embodiments, the disclosed slides, systems, and methods employ the use of pathology slides that include visibly perceptible separation marks to separate various regions on the slides. The concepts disclosed herein may enable improved processing of tissue samples, as will be apparent to those skilled in the art upon reviewing the present disclosure.

Figure 1:
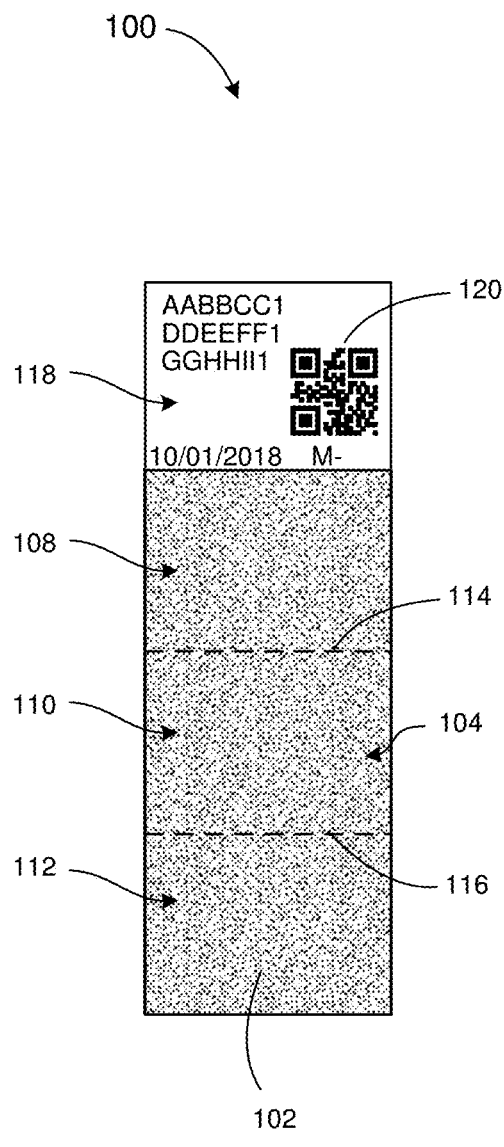
FIG. 1 is a schematic top view of a pathology slide, according to at least one embodiment of the present disclosure.
Figure 2:
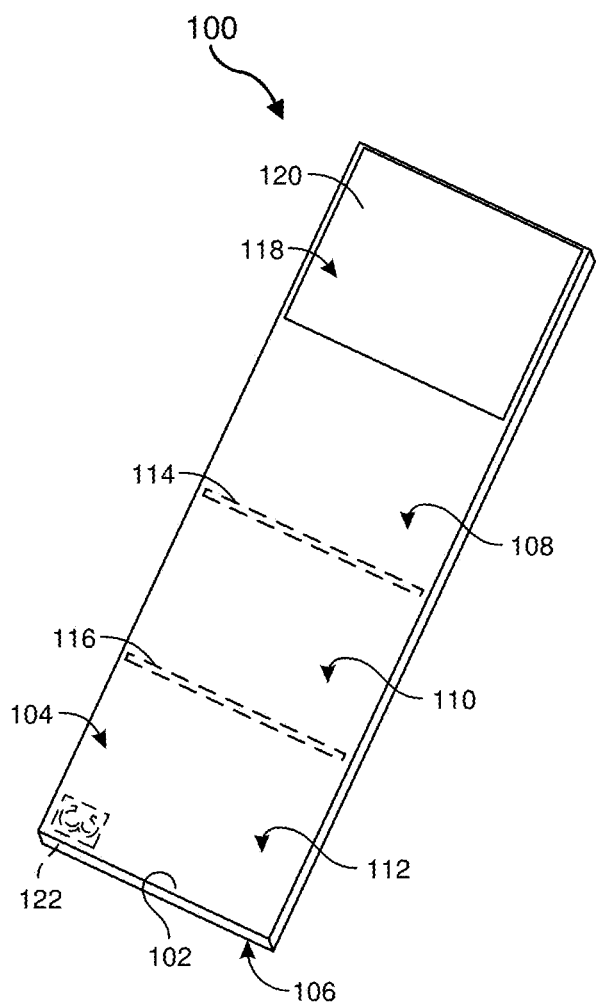
FIG. 2 is a perspective view of the pathology slide of FIG. 1, according to at least one embodiment of the present disclosure.

FIG. 1 is a schematic top view of a pathology slide 100, and FIG. 2 is a perspective view of the pathology slide 100. The pathology slide 100 may include a substantially transparent substrate 102 with a top major surface 104 and an opposing bottom major surface 106. In some examples, the top major surface 104 may be the surface on which one or more biopsy tissue sample sections are to be positioned. The top major surface 104 may include a first region 108, a second region 110, and a third region 112 having a size sufficient for receiving three respective biopsy tissue sample sections. The first and second regions 108, 110 may be separated by a first visibly perceptible separation mark 114 (also referred to herein as "first separation mark 114" for simplicity). The second and third regions 110, 112 may be separated by a second visibly perceptible separation mark 116 (also referred to herein as "second separation mark 116" for simplicity).

In some examples, the term "substantially" in reference to a given parameter, property, or condition may refer to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met. In some examples, relational terms, such as "first," "second," "third," "top," "bottom," etc., may be used for clarity and convenience in understanding the disclosure and accompanying drawings and do not connote or depend on any specific preference, orientation, or order, except where the context clearly indicates otherwise.

The top major surface 104 may also include a tracking region 118, which may be sized and configured for receiving a radio-frequency identification (RFID) chip, a slide label, or a printing medium (e.g., ink, etc.) for tracking the pathology slide 100 and/or biopsy tissue sample section(s) located on the pathology slide 100. In the example shown in FIGS. 1 and 2, the tracking region 118 is illustrated as including a slide label 120. As shown in FIGS. 1 and 2, the tracking region 118 may be adjacent to the first region 108, and the third region 112 may be on a side of the top major surface 104 opposite the tracking region 118. The second region 110 may be positioned between the first region 108 and the third region 112. In additional examples, other physical arrangements of the first, second, and third regions 108, 110, 112 and the tracking region 118 may be employed.

The substantially transparent substrate 102 may be formed of a variety of different materials. For example, the substantially transparent substrate 102 may include a glass or polymer material. In some examples, the substantially transparent substrate 102 may be ionically charged, such as to facilitate binding of one or more materials (e.g., a biopsy tissue sample section, a stain reagent, etc.) to the top major surface 104.

The first and second separation marks 114, 116 may be formed in a variety of different ways and may have a variety of different forms. For example, the separation marks 114, 116 may be printed (e.g., ink, paint, screen-printed, etc.) or adhered (e.g., a sticker) on the substantially transparent substrate 102. In additional examples, the separation marks 114, 116 may be in the form of a void of material in the substantially transparent substrate 102. For example, the void may be formed by etching (e.g., laser etching, chemical etching, etc.), scratching, or grinding select portions of the substantially transparent substrate 102. The first and second separation marks 114, 116 may be positioned on the top major surface 104, the bottom major surface 106, or both. By way of non-limiting example, placement of the first and second separation marks 114, 116 on the bottom major surface 106 may reduce or eliminate interference between the first and second separation marks 114, 116 with the biopsy tissue sample sections, stain, and/or protective coating applied to the pathology slide 100. For example, if the first and second separation marks 114, 116 are formed as voids in the top major surface 104 of the substantially transparent substrate 102, a protective coating applied to the top major surface 104 may at least partially fill the voids and reduce their subsequent visibility. Thus, locating the first and second separation marks 114, 116 on the bottom major surface 106 may improve their visibility after the pathology slide 100 undergoes processing. However, the present disclosure also includes embodiments in which the first and second separation marks 114, 116 are located on the top major surface 104, which may be desirable in some instances, such as for cost reduction or for separation marks 114, 116 that may still be visible after the pathology slide 100 undergoes processing.

As illustrated in FIGS. 1 and 2, the first and second separation marks 114, 116 may be in the form of a substantially straight line. In additional examples, the first and second separation marks 114, 116 may have other configurations. For example, the first and second separation marks 114, 116 may be or include dashed lines, dotted lines, a string of alphanumeric symbols, an orientation arrow, multiple arrows, other graphical symbols, combinations thereof, etc. In some embodiments, each of the first and second separation marks 114, 116 may have a different configuration to distinguish the separation marks 114, 116 from each other, such as for unique and visual identification of either the first separation mark 114 or the second separation mark 116. For example, the first separation mark 114 may be a substantially straight line, and the second separation mark 116 may be two substantially straight lines separated from each other or a dashed line.

The tracking region 118 may be sized and configured for containing identification information. For example, the identification information may include information that may uniquely identify one or more of the following: the physical pathology slide 100; the origin (e.g., manufacturing facility) of the pathology slide 100; the type of pathology slide 100 (e.g., ionically charged, not ionically charged, material, thickness, presence of functional or distinguishing features, number of regions separated by separation marks, etc.); the type of stain to be applied to the tissue sample(s) located on the pathology slide 100; the patient(s) from which the tissue sample(s) originated; the type of biopsy (e.g., needle-core biopsy, punch biopsy, etc.) of the tissue sample(s); the particular tissue sample(s) located on the pathology slide 100; a date (e.g., the date the tissue sample section was taken, the date the stain is applied, the date the tissue sample was obtained from the patient, etc.); a barcode; a two-dimensional scannable code (e.g., a so-called "QR code"); and/or a tracking code. By way of example and not limitation, the identification information may be or include a tracking code for each of the biopsy tissue sample sections to be located on the pathology slide 100, and other identification information may be accessible with the tracking code, such as from a database. In the example shown in FIGS. 1 and 2, the slide label 120 may include three tracking codes (shown as "AABBCC1," "DDEEFF1," and "GGHHII1") corresponding to the three regions 108, 110, and 112. By way of example and not limitation, the top tracking code may correspond to a tissue sample in the first region 108, the middle tracking code may correspond to a tissue sample in the second region 110, and the bottom tracking code may correspond to a tissue sample in the third region 112.

Although the pathology slide 100 is shown and described herein with three regions 108, 110, and 112 for receiving up to three respective biopsy tissue sample sections, the present disclosure is not so limited. In additional examples, pathology slides according to the present disclosure may include two, three, four, or more regions separated by visibly perceptible separation marks.

In some embodiments, the pathology slide 100 may optionally include one or more additional features. For example, region identifiers 122 (FIG. 2) may be included on the top major surface 104 or bottom major surface 106 in each of the regions 108, 110, 112 to uniquely identify the respective regions 108, 112, 112, including in images taken of the respective regions 108, 110, 112 alone. For example, a numeral "1" or letter "A" may be located in the first region 108, a numeral "2" or letter "B" may be located in the second region 110, and a numeral "3" (shown in FIG. 2 in dashed lines) or letter "C" may be located in the third region 112. In some embodiments, the region identifiers 122 may be voids in the substantially transparent substrate 102, such as in the bottom major surface 106. Alternatively, the separation marks 114, 116 themselves may be used to uniquely identify each of the regions 108, 110, 112. For example, if the top major surface 104 is viewed with the tracking region 118 positioned on the left, the first separation mark 114 will be located on the right of the first region 108, the second region 110 will have the first and second separation marks 114, 116 on either side, and the third region 112 will have the second separation mark 116 on the left. Thus, given an orientation (e.g., a predetermined standard orientation) of the pathology slide 100 (or portion thereof) and the location and orientation of the separation mark(s) 114, 116, each of the regions 108, 110, 112 may be uniquely identified. In addition, the separation marks 114, 116 may be configured for identifying a proper (e.g., predetermined standard) orientation of an image of each of the regions 108, 110, 112. For example, each orientation mark 114, 116 may be positioned closer to one lateral side of the pathology slide 100 and/or may include an orientation marker (e.g., an arrowhead).

The configuration of the pathology slide 100 including the separation marks 114, 116 may enable the simultaneous processing (e.g., staining) of multiple different tissue samples on the same pathology slide 100. The processing of multiple different tissue samples together may be referred to as "multiplexing." For example, the different tissue samples may be from a single patient, from different patients, different types of tissue samples, etc. The different tissue samples on the same pathology slide 100 may require the same processing (e.g., staining). By processing the multiple different tissue samples together on the same pathology slide 100, the incremental cost of the processing may be reduced by a factor approximately equal to the number of tissue samples simultaneously processed. For example, the cost of a stain used for a slide with a single tissue sample may be the same or approximately equal to the cost of a stain used for a slide with multiple tissue samples. However, as introduced above, conventional histopathology techniques generally avoid the processing different tissue samples together to avoid problems with identifying the different tissue samples. As will be explained further below, pathology slides according to the present disclosure may alleviate these problems and enable and/or facilitate multiplexing.

Figure 3:
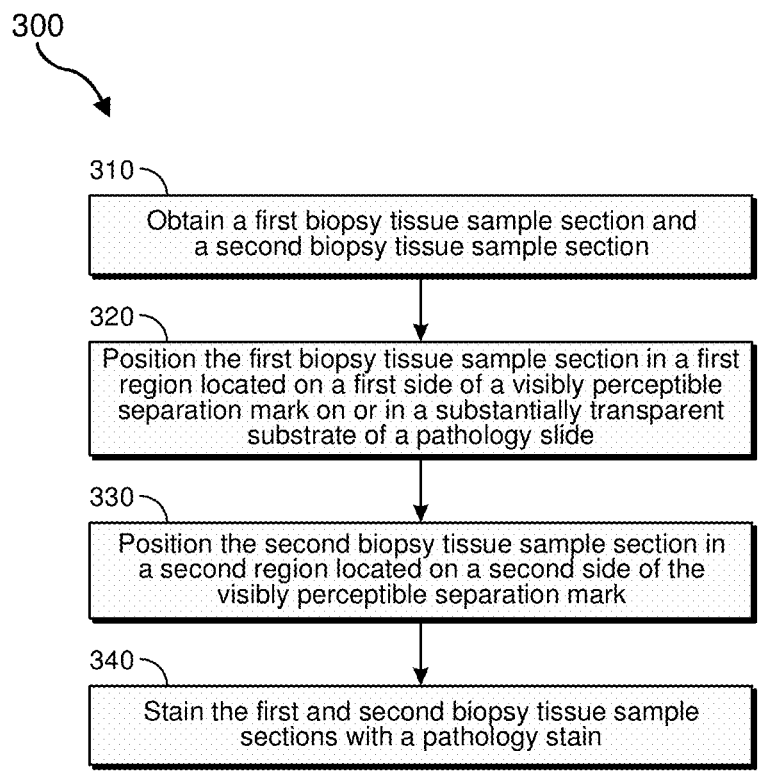
FIG. 3 is a flow diagram illustrating a method for preparing and processing a pathology slide, according to at least one embodiment of the present disclosure.

FIG. 3 is a flow diagram illustrating a method 300 for preparing and processing a pathology slide, according to at least one embodiment of the present disclosure. At operation 310, a first biopsy tissue sample section and a second biopsy tissue sample section may be obtained. The first and second biopsy tissue sample sections may be from a same patient or from two different patients. Operation 310 may be performed in a variety of different ways. For example, a first tissue block may be sectioned by a microtome to obtain the first biopsy tissue sample section, and a second tissue block (e.g., containing a tissue sample from a same patient or from a different patient) may be sectioned by a microtome to obtain the second biopsy tissue sample section. In additional embodiments, two biopsy tissue sample sections may be taken from the same tissue block for processing together.

At operation 320, the first biopsy tissue sample section may be positioned in a first region of a top major surface of a substantially transparent substrate of a pathology slide located on a first side of a visibly perceptible separation mark on or in the substantially transparent substrate. For example, the pathology slide may have the configuration of the pathology slide 100 described above with reference to FIGS. 1 and 2, including the visibly perceptible separation marks 114, 116.

Referring again to FIG. 3, at operation 330, the second biopsy tissue sample section may be positioned in a second region of the top major surface of the substantially transparent substrate of the same pathology slide. The second region may be located on a second, opposite side of the visibly perceptible separation mark on or in the substantially transparent substrate.

At operation 340, the first and second biopsy tissue sample sections may be stained with a pathology stain. The pathology stain may, in some embodiments, be a specialized pathology stain, such as the PIN4 pathology stain described above. By staining the first and second biopsy tissue sample sections simultaneously and in the same process, the cost of the pathology stain may be shared by both of the tissue sample sections, reducing the per-sample cost of the pathological processing compared to conventional techniques.

The method 300 may, optionally, also include different or additional operations. For example, identification information may be printed on a slide label adhered to a tracking region of the substantially transparent substrate of the pathology slide. In some embodiments, the identification information may identify the patient(s) from which the first and second biopsy tissue sample sections originated, the type of stain to be applied to the biopsy tissue sample sections on the pathology slide, the date, etc. Examples of potential identification information on the slide label are described above with reference to FIG. 1. The method 300 may also include coating the stained first and second tissue samples on the pathology slide with a protective coating, such as a substantially transparent polymer coating.

A whole slide image (e.g., a digital image) of the pathology slide may be obtained. The whole slide image may include at least the visibly perceptible separation mark, the stained first biopsy tissue sample section, and the stained second biopsy tissue sample section. The whole slide image may, in some embodiments, also include the slide label, including identification information printed on the slide label.

In some embodiments, the whole slide image may be split into multiple images (e.g., digital images) corresponding to the multiple biopsy tissue sample sections in the whole slide image. For example, a first digital image may include the first biopsy tissue sample section and the visibly perceptible separation mark, with the second biopsy tissue sample section excluded. A second digital image may include the second biopsy tissue sample section and the visibly perceptible separation mark, with the first biopsy tissue sample section excluded. The first digital image may be associated with a first digital file. For example, the first digital file may be a medical (e.g., histopathology) file corresponding to the first biopsy tissue sample, to a first patient from which the biopsy tissue sample originated, etc. The second digital image may be associated with a second digital file. For example, the second digital file may be a medical (e.g., histopathology) file corresponding to the second biopsy tissue sample, to a second patient from which the second biopsy tissue sample originated, etc. Information from the slide label (or from other information that may be contained in a tracking region of the pathology slide, e.g., from an RFID chip, from information etched into or printed on the pathology slide, etc.) may be used to associate the first and second digital images to the appropriate digital file(s).

The first digital image may then be presented to a pathologist (or other human reviewer) and/or to an artificial intelligence ("AI") system for review and/or diagnosis associated with the first biopsy tissue sample and/or the first patient. Likewise, the second digital image may be presented to a pathologist (or other human reviewer) and/or to an AI system for review and/or diagnosis associated with the second biopsy tissue sample and/or the second patient. By splitting the whole slide image into separate first and second digital images corresponding to the respective first and second biopsy tissue samples, and by associating the first and second digital images with the respective first and second digital files, potential confusion over which tissue sample is being viewed or which patient is associated with the tissue sample may be reduced or eliminated.

As noted above, in some embodiments, the whole slide image and/or split digital image may be reviewed by an AI system, which may employ machine learning. The review by the AI system may be in place of or in conjunction with review by a pathologist or other human reviewer. For example, the AI system may be programmed (e.g., digitally trained) to identify and/or distinguish from the image: the visibly perceptible separation marks; identification information in the tracking region; the presence, location, orientation, shape, topographical features, normal cellular material, and/or abnormal cellular material of the tissue sample; and/or a sectioned matrix (described below) holding the tissue sample in the tissue sample block from which the section was taken. Data from the AI system may be used, for example, to identify the tissue sample, to identify the patient from which the tissue sample was taken, to identify a digital file with which the image should be associated, to identify and/or mark areas of concern in the tissue sample, to identify an orientation of the tissue sample, to estimate a likelihood that tissue samples in two digital images are from a same patient, etc. Feedback (e.g., from a pathologist) regarding whether the identified information in fact has the characteristics flagged by the AI system may be provided to the AI system, enabling the AI system to be trained and improve its capabilities.

In some embodiments, topographical information recognized by the AI system may be used to associate two or more images of different tissue samples. For example, although individual sections of a tissue block are different due to being taken at different elevations, certain topographical features may be common among the individual sections. Thus, the presence, orientation, outline, shape, etc. of the tissue sample, portions thereof, and/or surrounding matrix may be used by the AI system to confirm or suggest that two or more individual sections were taken from the same tissue block. Upon analyzing whether two different sections were taken from the same tissue block, the AI system may assign a confidence level in the results of the analysis. For example, the AI system may indicate that there is a 90% confidence level that the two different sections were taken from the same tissue block, which can be confirmed by a pathologist upon review of the images of the two different sections. The confirmation (or denial) by the pathologist may provide feedback to train the AI system to improve future analyses and confidence levels. In some embodiments, this confirmation or suggestion may be used as a check to ensure that the same tissue sample is present in two or more separate images.

In some embodiments, preparation of tissue blocks may include holding the tissue sample(s) in a matrix of sectionable material prior to molding the tissue sample into a tissue block. By way of example and not limitation, the matrix may have a composition and/or configuration as described and shown in one or more of: U.S. Pat. No. 9,851,349, titled "MATRIX FOR RECEIVING A TISSUE SAMPLE AND USE THEREOF," filed Dec. 26, 2013; U.S. patent application Ser. No. 15/893,061, titled "SYSTEMS AND METHODS FOR TISSUE SAMPLE PROCESSING," filed Feb. 9, 2018 (also referred to as "the '061 application"); and/or U.S. Design patent application Ser. No. 29/593,566, tilted "TISSUE SAMPLE RECEPTACLE," filed Feb. 9, 2017. The entire disclosure of each of these documents is hereby incorporated herein by reference. In some examples, the matrix may include a sectionable code, such as is described in the '061 application, which may be associated with the digital file of the tissue sample and/or patient corresponding to the tissue sample. In such examples, the AI system of the present disclosure may be capable of identifying the sectionable code (e.g., an alphanumeric code, etc.) of the matrix from an image of the biopsy tissue sample section, such as to uniquely identify the tissue block from which the section was taken and ultimately to identify the patient from which the tissue sample was taken. Optionally, the identification information in the tracking region of the pathology slide may be omitted and replaced, or augmented by, information associated with the sectionable code.

In some embodiments, the AI system may also be trained to recognize and identify the type of tissue in an image of a prepared pathology slide and/or of a gross tissue sample. For example, tissue samples from different tissue types (e.g., different organs or body parts) may have different identifying features, such as cell shape and size, sample shape and size, presence and size of cell components, color, etc. In addition, different stains used in processing certain tissue types have different characteristics, such as color. Pathologists are often capable of identifying different tissue types by recognizing these features. AI systems may be trained to recognize distinguishing features of different tissue types from images of prepared pathological slides or of gross tissue samples. For example, hundreds, thousands, or more images of tissue samples from known organs may be presented as a training set to, and analyzed by, the AI system.

In some examples, the training set may include images that were processed by different pathological laboratories, stained using different stains, prepared according to different protocols, and/or taken by different image sensors (e.g., cameras) to improve the training of the AI system. When a tissue sample is processed in these different ways, the results are often somewhat different. For example, different protocols may result in images having slightly different color, shading, orientation, etc. By including these diverse images in the training set, the AI system may be more robustly trained and capable of properly analyzing images from different laboratories. The tissue type (e.g., organ) may be identified and correlated to the images so that the AI system may be trained to recognize the type of tissue from the images, such as by identifying and correlating the tissue sample features mentioned above. As with other analyses performed by the AI system, during training and/or after the AI system is trained, a confidence level may be associated with a tissue type determination. Feedback (e.g., confirmation or denial) may be provided to further train the AI system to improve its analysis capabilities, accuracy, and confidence level.

In some embodiments in which an AI system is trained and used to recognize and identify tissue types, pathological processing may be improved in one or more ways. For example, the identification of the tissue type may be used by the AI system to subsequently invoke a particular protocol and/or algorithm for further analysis on the image of the tissue sample, such as to identify abnormal cells or other areas of interest to highlight for the pathologist's consideration. In addition, the accuracy of the analysis may be improved to suggest more relevant potential diagnoses to a pathologist for review and confirmation. Tissue identification may also confirm (or improve a confidence level) that a particular image of a tissue sample is associated with the correct patient and/or procedure. If the AI system is used to identify a tissue type from an image of a gross tissue sample, the AI system may also be used to suggest different pathological processing protocols (e.g., stains, laboratory procedures, etc.) that are appropriate for the tissue type.

Figure 4:
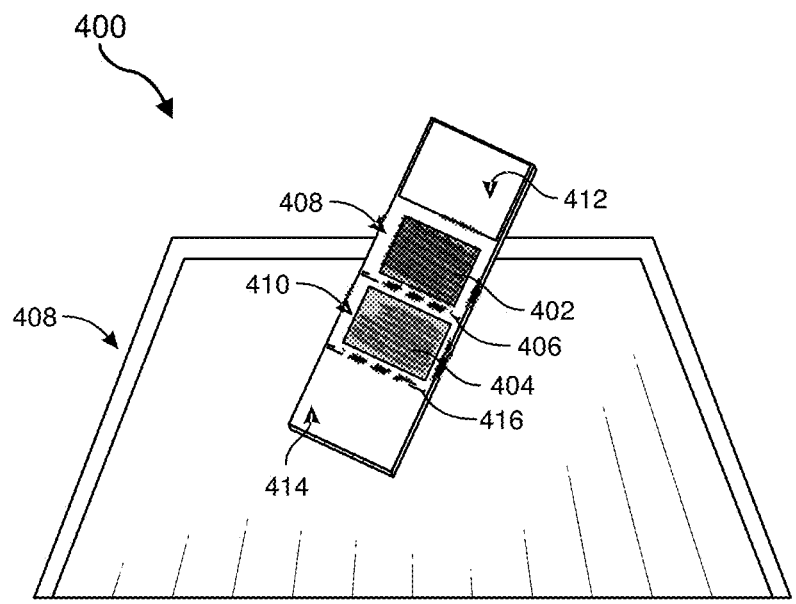
FIG. 4 is a perspective view of a pathology slide and flotation bath, according to at least one embodiment of the present disclosure.

The method 300 illustrated in FIG. 3 may be implemented in a variety of ways. For example, FIG. 4 is a perspective view of a pathology slide 400 and a flotation bath 450 that may be used in performing operations 320 and 330 described above to position a first biopsy tissue sample section 402 and a second biopsy tissue sample section 404 on the pathology slide 400. The pathology slide 400 may include features as described above in relation to the pathology slide 100 of FIGS. 1 and 2. For example, the pathology slide 400 may include a first visibly perceptible separation mark 406 separating a first region 408 and a second region 410 on the pathology slide 400. The first and second regions 408, 410 may be for containing the respective first and second biopsy tissue sample sections 402, 404. In some embodiments, the pathology slide 400 may also include a tracking region 412.

In use, a laboratory technician may obtain (e.g., using a microtome) and place the first biopsy tissue sample section 402 in the flotation bath 450. The laboratory technician may then grasp the pathology slide 400 by at the tracking region 412, dip the pathology slide 400 in the flotation bath 450 and under the first biopsy tissue sample section 402, and lift the first biopsy tissue sample section 402 with the pathology slide 400 to position the first biopsy tissue sample section 402 in the first region 408. Similarly, the second biopsy tissue sample section 404 may be obtained (e.g., with a microtome) and positioned on the pathology slide 400 in the second region 410. In some implementations, additional biopsy tissue sample sections may be obtained and positioned on the pathology slide 400. For example, a third biopsy tissue sample section may be obtained and positioned in a third region 414 of the pathology slide 400, which may be separated from the second region 410 by a second visibly perceptible separation mark 416. At least the first and second biopsy tissue sample sections 402, 404 may, together, be stained with a common pathology stain.

A whole slide image may be taken of the pathology slide 400 and stained first and second biopsy tissue sample sections 402, 404, as discussed above. Optionally, the whole slide image may be split into first and second digital images, as also discussed above.

Figure 5:
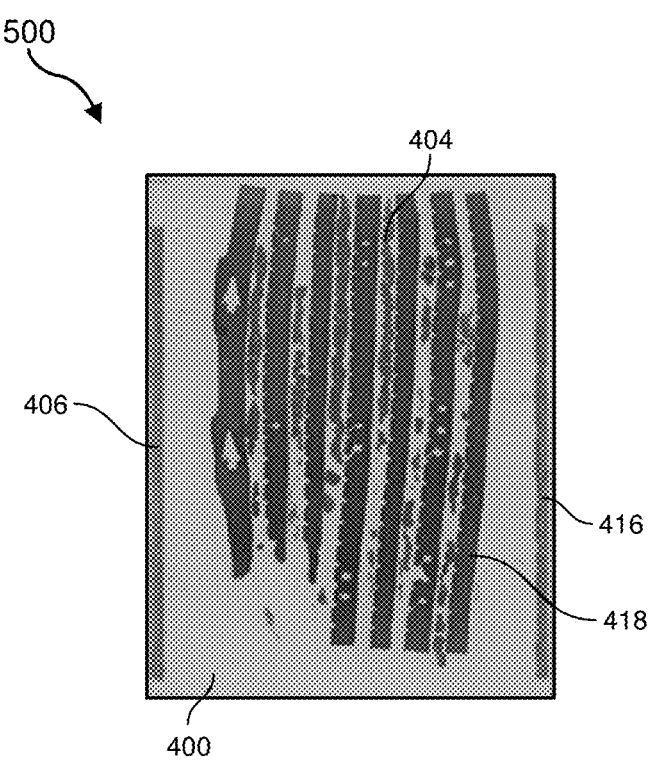
FIG. 5 is a top view of an image of a stained biopsy tissue sample on a pathology slide according to at least one embodiment of the present disclosure.

FIG. 5 illustrates a digital image 500 of the second biopsy tissue sample section 404. The digital image 500 may include the second biopsy tissue sample section 404, any surrounding matrix 418, the first separation mark 406 on a first (e.g., left) side of the second biopsy tissue sample section 404, and the second separation mark 416 on a second, opposite (e.g., right) side of the second biopsy tissue sample section 404. The presence of both of the first and second separation marks 406, 416 on opposing sides of the second biopsy tissue sample section 404 may help identify the digital image 500 as being from the second region 410 of the pathology slide 400. The digital image 500 may be associated with a digital file as described above, such as with a medical (e.g., histopathology) file of the patient from which the second biopsy tissue sample section 404 originated. The digital image 500 (and/or the whole slide image from which the digital image 500 was split) may be analyzed by an AI system, as described above. The digital image 500 may also be presented to a pathologist for review and potential diagnosis. If analysis by the AI system has been performed on the digital image 500, results of the analysis (e.g., tissue type identification, areas of potential concern, patient information, etc.) may be presented to the pathologist, such as with a confidence level. Feedback may be received from the pathologist and incorporated into the AI system, such as for training and improved future analyses of the AI system.

Figure 6:
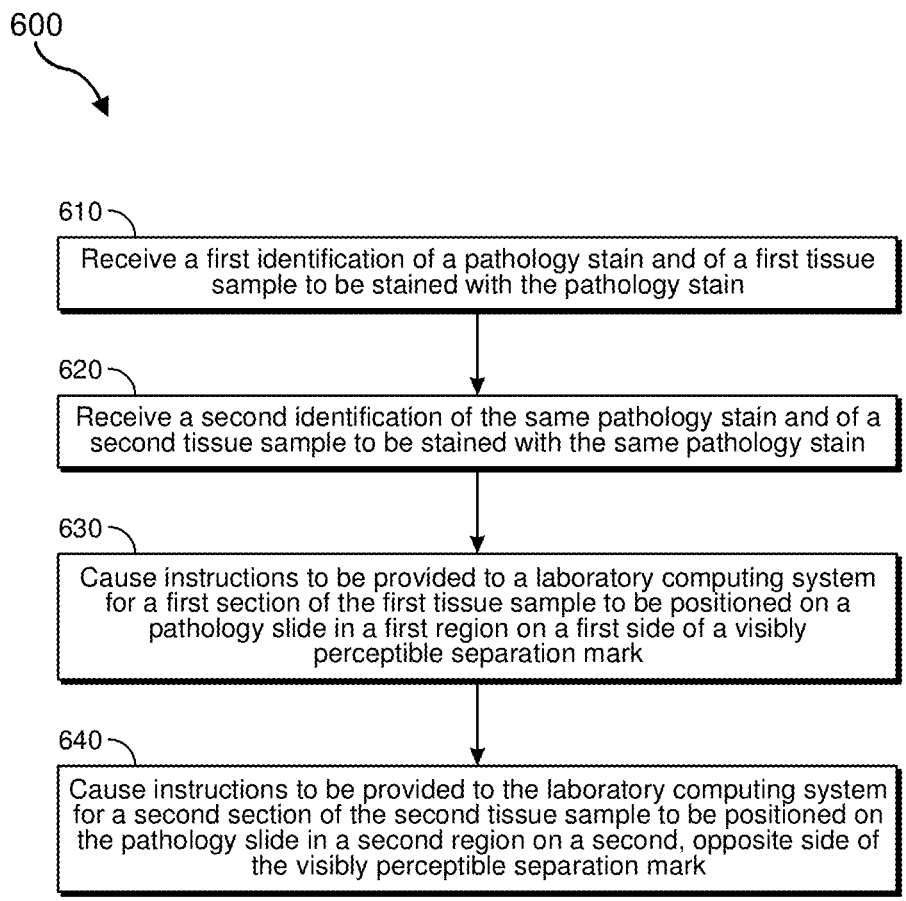
FIG. 6 is a flow diagram illustrating a computer-implemented method for biopsy tissue sample processing, according to at least one embodiment of the present disclosure.

FIG. 6 is a flow diagram illustrating a computer-implemented method 600 for biopsy tissue sample processing. In operation 610, a first identification of a pathology stain and of a first tissue sample to be stained with the pathology stain may be received. For example, the first identification may be received from a user (e.g., a pathologist) of a pathology computing system at a processor, such as in response to the user selecting or entering the desired pathology stain and identification information for the first tissue sample in a graphical user interface. In additional embodiments, the first identification may be received from, or at least suggested by, an AI system. The first identification may instruct a laboratory to obtain a first section of the first tissue sample, to place the first section on a pathology slide, and to apply the pathology stain to the first tissue sample. Optionally, the first identification may also indicate where (e.g., in a first region) on the pathology slide the first section should be positioned during application of the stain.

At operation 620, a second identification of the same pathology stain and of a second tissue sample to be stained with the same pathology stain may be received. For example, the second identification may be received from the user and/or from the AI system at the processor, such as in response to the user and/or AI system selecting or entering the desired pathology stain and identification information for the second tissue sample in the graphical user interface. The second identification may instruct the laboratory to obtain a second section of the second tissue sample, to place the second section on the pathology slide, and to apply the pathology stain to the second tissue sample. Optionally, the second identification may also indicate where (e.g., in a second region) on the pathology slide the second tissue sample should be positioned during application of the stain. By way of non-limiting example, the first tissue sample and the second tissue sample may originate from two different patients.

In operation 630, instructions may be caused to be provided to a laboratory computing system for the first section to be positioned on the pathology slide in the first region, which may be on a first side of a visibly perceptible separation mark on or in a substantially transparent substrate of the pathology slide. Operation 630 may be performed by the processor, which may be in communication with the laboratory computing system and with the pathology computing system. The instructions for positioning the first section on the pathology slide may be displayed to, for example, a laboratory technician on a laboratory display.

In operation 640, instructions may be caused to be provided to the laboratory computing system for the second section to be positioned on the pathology slide in the second region, which may be on a second, opposite side of the visibly perceptible separation mark on or in the substantially transparent substrate of the pathology slide. Operation 640 may be performed by the processor. The instructions for positioning the second section on the pathology slide may be displayed to, for example, the laboratory technician on the laboratory display.

Further instructions may also be provided to the laboratory computer system that indicate, for example, the pathology stain to be applied to the first and second sections. The processor may also cause a label on the pathology slide to be printed with information. For example, the information may identify: tracking information for the first tissue sample and for the second tissue sample; the pathology stain to be applied to the first and second sections; a date (e.g., the date of the printing, the date the tissue samples were obtained, etc.); the first tissue sample and the second tissue sample; and/or the two different patients from which the tissue samples were obtained (if applicable).

The processor may also cause a digital image (e.g., a whole slide image) to be taken of the pathology slide, the first tissue sample, and the second tissue sample. The digital image may also include the visibly perceptible separation mark. The digital image may be split by the processor into a first digital image of the first tissue sample (and, optionally, of the visibly perceptible separation mark) and at least a second digital image of the second tissue sample (and, optionally, of the visibly separation mark). At least a portion of the digital image (e.g., the first digital image, the second digital image, and/or the whole slide image) may be presented to the user (e.g., a pathologist) for review. In some embodiments, the processor (e.g., of an AI system) may digitally analyze at least a portion of the digital image (e.g., the first digital image, the second digital image, and/or the whole slide image) to identify at least one feature in the digital image. For example, artificial intelligence and/or machine learning may be used to identify the at least one feature, as described above.

Figure 7:
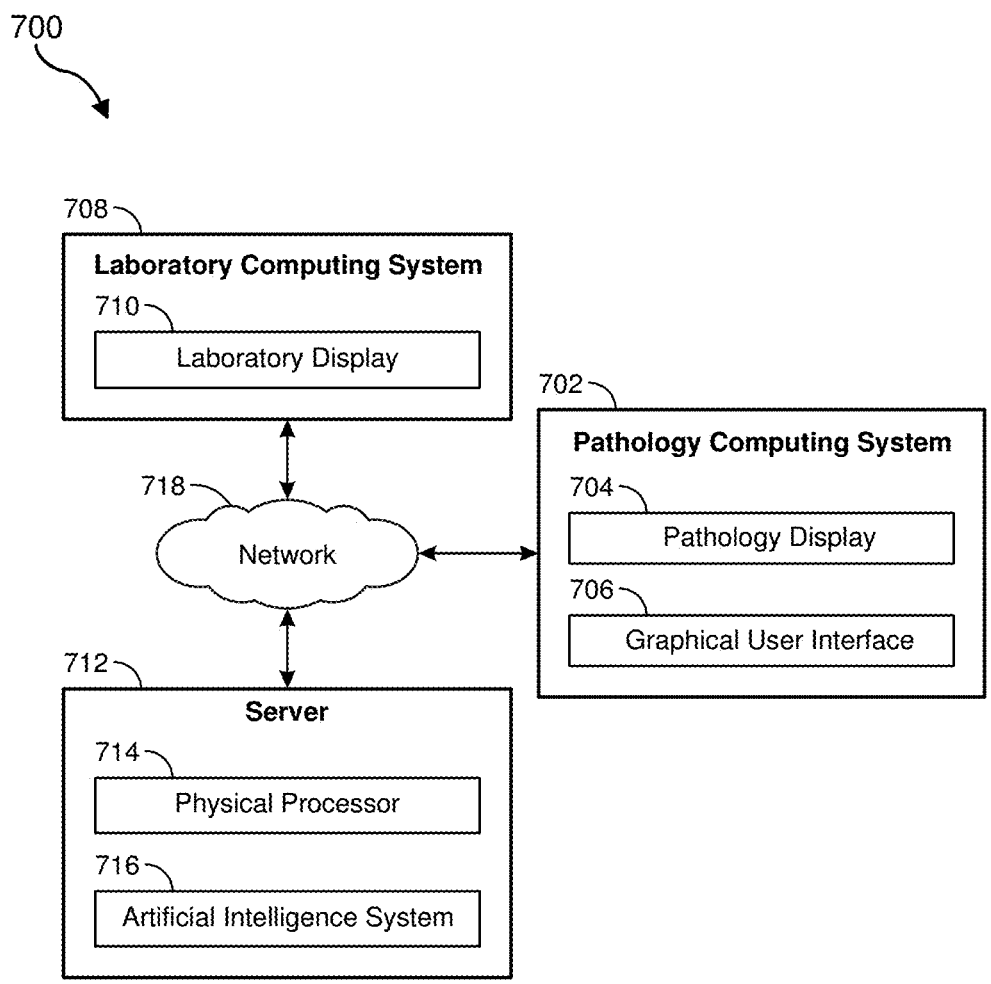
FIG. 7 is a block diagram illustrating a system, according to at least one embodiment of the present disclosure.

The computer-implemented method 600 illustrated in FIG. 6 may be implemented in a variety of ways. For example, FIG. 7 illustrates an example system 700 that may perform the computer-implemented method 600. The system 700 may include a pathology computing system 702, a laboratory computing system 708, and a server 712.

The pathology computing system 702 may include a pathology display 704 for displaying a graphical user interface 706 to a user (e.g., a pathologist). The user may interact with the graphical user interface 706 to, for example, request that a certain pathology stain be applied to a section of a particular tissue sample. The pathology display 704 may also be configured to present an image of a tissue sample to the user, such as for review and diagnosis.

The laboratory computing system 708 may include at least a laboratory display 710 for displaying instructions, such as to a laboratory technician, to perform certain actions. For example, the instructions may include obtaining the particular tissue sample from storage, obtaining a section from the tissue sample, placing the tissue sample section in a predetermined location on a pathology slide, printing a slide label, applying the certain pathology stain to the tissue sample section, and/or capturing an image of the pathology slide with the stained tissue sample section thereon.

The server 712 may include at least one physical processor 714. In some examples, reference to "a processor" may include multiple processors or a single processor to perform the various actions described herein. The server 712 may also include an artificial intelligence system 716, which may be separate from or a part of the physical processor 714. The artificial intelligence system 716 may be used to analyze digital images from the laboratory computing system, such as to identify features of the digital images, as described above. The physical processor 714 may be configured to receive instructions from and/or send instructions to the pathology computing system 702, and/or to receive instructions from and/or send instructions to the laboratory computing system 708.

The pathology computing system 702, laboratory computing system 708, and server 712 may communicate with each other through a network 718. The network 718 generally represents any medium or architecture capable of facilitating electronic communication or data transfer. The network 718 may facilitate communication or data transfer using wireless and/or wired connections. Examples of the network 718 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some examples, all or a portion of the system 700 in FIG. 7 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the system 700 in FIG. 7 may facilitate multi-tenancy within a cloud-based computing environment. In other words, the software modules described herein may configure a computing system (e.g., a server) to facilitate multi-tenancy for one or more of the functions described herein. For example, one or more software modules may program a server to enable two or more clients (e.g., customers) to share an application that is running on the server. A server programmed in this manner may share an application, operating system, processing system, and/or storage system among multiple customers (i.e., tenants). One or more of the systems described herein may also partition data and/or configuration information of a multi-tenant application for each customer such that one customer cannot access data and/or configuration information of another customer.

According to various embodiments, all or a portion of the system 700 in FIG. 7 may be implemented within a virtual environment. For example, modules and/or data may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter)

that presents the virtualization layer as though it were part of an underlying base operating system. For example, a software virtualization solution may redirect calls that are initially directed to locations within a base file system and/or registry to locations within a virtualization layer.

In some examples, all or a portion of the system 700 in FIG. 7 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions and operations described herein may be provided for a mobile computing environment and/or may interact with a mobile computing environment. By way of example and not limitation, the pathology computing system 702 may be or include a mobile device, such as a tablet computer.

In addition, all or a portion of the system 700 in FIG. 7 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, security systems, and the like.

In some embodiments, all or a portion of the system 700 in FIG. 7 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the system 700 in FIG. 7 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

Figure 8:
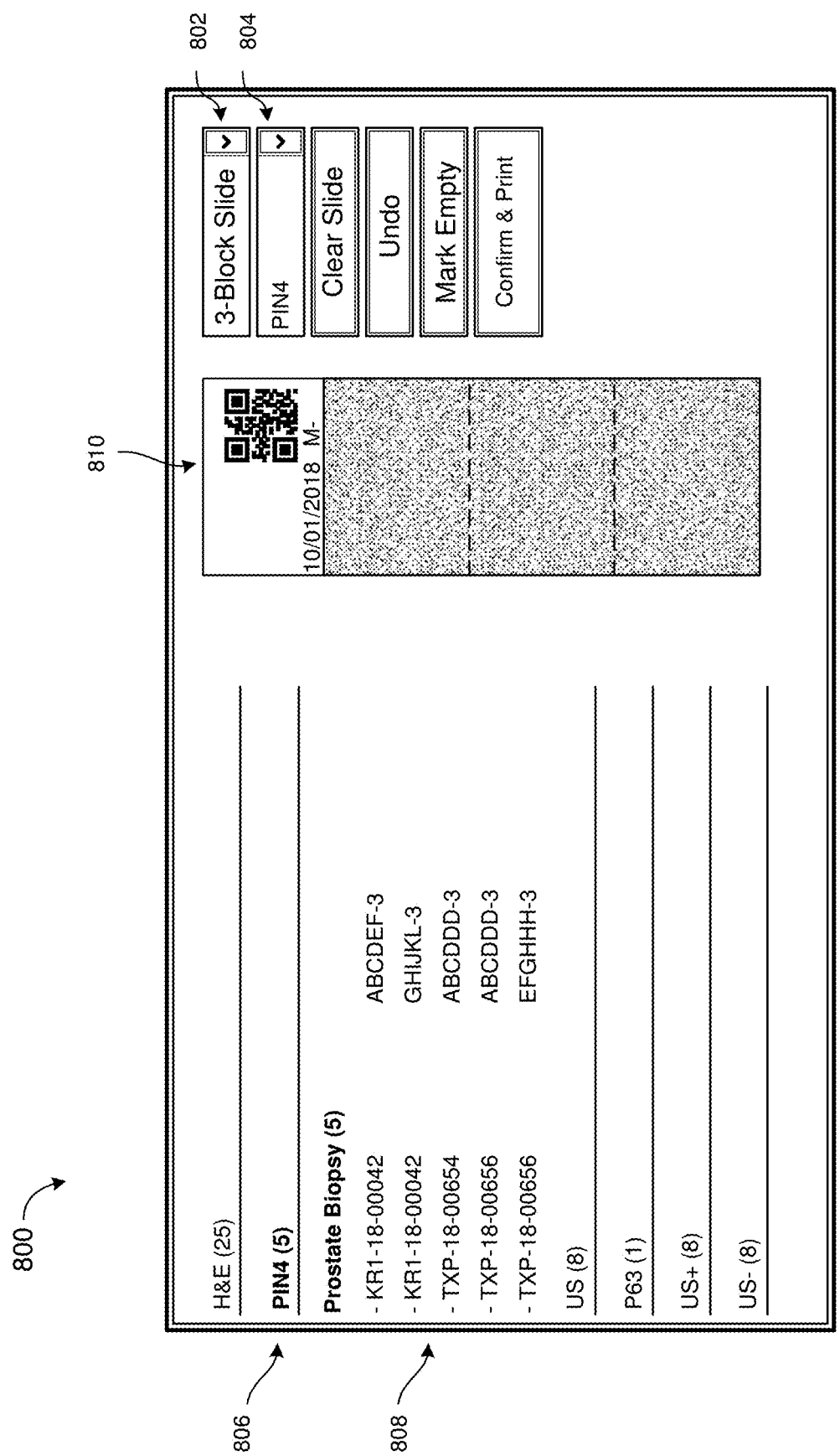
FIG. 8 illustrates a graphical user interface that may be used in conjunction with the computer-implemented method illustrated in FIG. 6 and/or the system of FIG. 7, according to at least one embodiment of the present disclosure.

FIG. 8 illustrates a graphical user interface 800 that may be used in conjunction with the computer-implemented method 600 illustrated in FIG. 6 and/or the system 700 illustrated in FIG. 7, according some embodiments. The graphical user interface 800 may, for example, be used as the graphical user interface 706 of the pathology computing system 702 of the system 700. As shown in FIG. 8, the graphical user interface 800 may include a pathology slide selection menu 802, a pathology stain selection menu 804, a biopsy type selection menu 806, tissue sample selection menu 808, and a representation of a pathology slide 810.

A user may interact with the graphical user interface 800 by selecting a type of pathology slide from the pathology slide selection menu 802. For example, a two-block slide, a three-block slide, or a four-block slide may be offered as selections in the pathology slide selection menu 802. A particular pathology stain may be selected in the pathology stain selection menu 804. For example, H&E, PIN4, and/or other pathology stains may be offered as selections in the pathology stain selection menu. The biopsy type selection menu 806 may automatically display options corresponding to the selected pathology stain. For example, different pathology stains may be compatible with different biopsy types, such as prostate biopsies, breast biopsies, kidney biopsies, lung biopsies, etc. Tissue sample identification information (e.g., tracking information) for the selected biopsy type may be displayed in the tissue sample selection menu 808. The user (e.g., a pathologist), may select a desired tissue sample from the tissue sample selection menu 808 for application of the selected pathology stain. In some embodiments, the user may drag the selected tissue sample to a certain region on the representation of the pathology slide 810, to provide an instruction of where a section of the selected tissue sample should be positioned for staining. Alternatively, the representation of the pathology slide 810 may auto-populate with the selected tissue sample in a particular region. The user may continue to select other tissue samples, or may select the same tissue sample to request additional sections of the same tissue sample, that are to receive the same pathology stain, up to a capacity of the type of slide selected in the pathology slide selection menu 802. In some embodiments, an image of (and/or other information relating to) a gross tissue sample may also be displayed on the graphical user interface 800.

Information collected through the graphical user interface 800 may be transmitted to a physical processor (e.g., to the physical processor 714 of the server 712 of the system 700 shown in FIG. 7). The information may be used to cause instructions to be sent to a laboratory computing system 708 for obtaining the selected tissue sample sections and applying the selected pathology stain to the selected tissue sample sections.

Accordingly, the pathology slides, methods, and systems of the present disclosure may enable efficient, cost-effective, and safe processing of biopsy tissue samples for histopathological review. Multiplexing may also be enabled, including the processing of biopsy tissue samples from different patients together, such as to share a cost of the processing between the different biopsy tissue samples. The pathology slides, methods, and systems disclosed herein may ensure or increase the likelihood that such tissue samples are not mixed, misplaced, or confused. Accordingly, the concepts of the present disclosure may improve several aspects of histopathology.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A pathology slide, comprising:
    a substantially transparent substrate that includes a top major surface and a bottom major surface on an opposite side of the substantially transparent substrate from the top major surface;
    at least two regions on the top major surface of the substantially transparent substrate, the at least two regions comprising at least two respective portions of the top major surface configured to receive at least two respective biopsy tissue sample sections on the substantially transparent substrate; and
    at least one substantially straight separation mark comprising a void in the bottom major surface of the substantially transparent substrate, the at least one separation mark positioned between and separating the at least two regions from each other.

2. The pathology slide of claim 1, wherein the at least two regions comprise at least three regions configured to receive at least three respective biopsy tissue sample sections, and wherein the at least one separation mark comprises at least two separation marks separating the at least three regions from each other.

3. The pathology slide of claim 1, further comprising a tracking region adjacent to the at Fast two regions, the tracking region having a size sufficient to receive at least one of:
    a radio-frequency identification (RFID) chip;
    a slide label; or
    a printing medium.

4. The pathology slide of claim 3, further comprising the slide label adhered to the tracking region.

5. The pathology slide of claim 1, wherein the substantially transparent substrate comprises a glass substrate.

6. The pathology slide of claim 1, wherein the at least one separation mark comprises at least one substantially straight line.

7. The pathology slide of claim 1, wherein the at least one separation mark comprises at least one of: a string of alphanumeric symbols; an orientation arrow; or multiple arrows.

8. The pathology slide of claim 1, wherein the at least one separation mark comprises: a dashed line; or a dotted line.

9. The pathology slide of claim 1, wherein the at least one separation mark comprises a first separation mark and a second separation mark.

10. The pathology slide of claim 9, wherein the first separation mark and the second separation mark have respectively different configurations to distinguish the first separation mark from the second separation mark.

* * * * *